(12) United States Patent
Kwun et al.

(10) Patent No.: US 9,107,169 B2
(45) Date of Patent: Aug. 11, 2015

(54) USER EQUIPMENT APPARATUS FOR TRANSMITTING A PLURALITY OF SIGNALS SIMULTANEOUSLY USING AT LEAST TWO WIRELESS COMMUNICATION SCHEMES AND METHOD THEREOF

(75) Inventors: Soonik Kwun, Seoul (KR); Inkyung Kim, Seoul (KR); Jaehyun Park, Gyeonggi-do (KR); Jaesung Yeom, Gyeonggi-do (KR); Yongnam Whang, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 284 days.

(21) Appl. No.: 13/171,274

(22) Filed: Jun. 28, 2011

(65) Prior Publication Data

US 2011/0319123 A1   Dec. 29, 2011

Related U.S. Application Data

(60) Provisional application No. 61/359,810, filed on Jun. 29, 2010.

(30) Foreign Application Priority Data

Oct. 29, 2010   (KR) .................. 10-2010-0107343
Nov. 9, 2010   (KR) .................. 10-2010-0111049
Nov. 9, 2010   (KR) .................. 10-2010-0111050

(51) Int. Cl.
*H04B 7/00* (2006.01)
*H04W 52/16* (2009.01)

(52) U.S. Cl.
CPC .................... *H04W 52/16* (2013.01)

(58) Field of Classification Search
CPC ..... H03G 3/3042; H04W 24/00; H04W 52/24
USPC ..................... 455/127.1, 425, 522
See application file for complete search history.

(56) References Cited

U.S. PATENT DOCUMENTS 5,991,618 A * 11/1999 Hall .............................. 455/425
6,570,929 B1 * 5/2003 Eriksson ..................... 375/260
6,587,672 B1 * 7/2003 Chuah et al. .................. 455/69

(Continued)

FOREIGN PATENT DOCUMENTS

JP   2012-527167   11/2012

*Primary Examiner* — Hai V Nguyen
(74) *Attorney, Agent, or Firm* — Lee, Hong, Degerman, Kang & Waimey

(57) ABSTRACT

A user equipment (UE) of a wireless communication system is disclosed. A second receiving module, of a second wireless communication chip, is configured for receiving a transmission power value of a first signal configured to be transmitted from a first wireless communication chip of the UE. A second transmission power value determining module, of the second wireless communication chip, is configured for determining a transmission power value of a second signal configured to be transmitted from the second wireless communication chip, the determination based on the received transmission power value of the first signal and a predefined specific absorption rate (SAR) condition, wherein the first wireless communication chip is configured for transmitting the first signal using a first wireless communication scheme, wherein the second wireless communication chip is configured for transmitting the second signal using a second wireless communication scheme simultaneously with the transmission of the first signal by the first wireless communication chip.

8 Claims, 10 Drawing Sheets

(56) References Cited

U.S. PATENT DOCUMENTS

| | | | |
|---|---|---|---|
| 8,781,437 B2* | 7/2014 | Ngai et al. | 455/404.1 |
| 8,909,282 B2* | 12/2014 | Ngai et al. | 455/522 |
| 2004/0176125 A1* | 9/2004 | Lee | 455/522 |
| 2005/0135312 A1* | 6/2005 | Montojo et al. | 370/335 |
| 2007/0111681 A1* | 5/2007 | Alberth et al. | 455/127.1 |
| 2007/0237118 A1* | 10/2007 | Seo | 370/335 |
| 2008/0004063 A1 | 1/2008 | Haapoja et al. | |
| 2009/0047902 A1* | 2/2009 | Nory et al. | 455/13.4 |
| 2010/0291963 A1* | 11/2010 | Patel et al. | 455/522 |
| 2011/0158117 A1* | 6/2011 | Ho et al. | 370/252 |
| 2011/0319120 A1* | 12/2011 | Chen et al. | 455/522 |
| 2012/0270519 A1* | 10/2012 | Ngai et al. | 455/404.1 |
| 2012/0270592 A1* | 10/2012 | Ngai et al. | 455/522 |
| 2014/0146919 A1* | 5/2014 | Li et al. | 375/297 |

* cited by examiner

USER EQUIPMENT APPARATUS FOR TRANSMITTING A PLURALITY OF SIGNALS SIMULTANEOUSLY USING AT LEAST TWO WIRELESS COMMUNICATION SCHEMES AND METHOD THEREOF

CROSS-REFERENCE TO RELATED APPLICATIONS

Pursuant to 35 U.S.C. §119, this application claims the benefit of earlier filing date and right of priority to Korean Application Nos. 10-2010-0111050, filed on Nov. 9, 2010, 10-2010-0111049, filed on Nov. 9, 2010, and 10-2010-0107343, filed on Oct. 29, 2010, and also claims the benefit of U.S. Provisional Application Ser. No. 61/359,810, filed on Jun. 29, 2010, the contents of which are hereby incorporated by reference herein in their entireties.

BACKGROUND OF THE INVENTION

1. Field of the Invention

The present invention relates to a user equipment (UE), and more particularly, to a user equipment apparatus for transmitting a plurality of signals simultaneously using at least two wireless communication schemes and method thereof.

2. Discussion of the Related Art

Recently, the demand for a use of radio waves keeps increasing owing to the remarkable development of the wireless communication technology. And, the radio waves are widely used for the medical industry, traffic control and daily life as well as for communications and broadcasting fields. Thus, as the use of electric devices rapidly increases, the electromagnetic waves radiating from the radio wave use facilities and devices have considerable influence on human body. Specifically, in case of a mobile communication device, U.S. FCC (Federal Communication Commission) adopts the guideline for environmental influence evaluation on radio frequency radiation of FCC 96-326 to regulate a limit for local power absorption applicable to a random mobile transmitting device. In this case, the limit of maximum allowable exposure is based on the exposure evaluation reference quantified into a specific absorption rate (SAR) that is a measure of a radio frequency (RF) energy absorption rate. In case that electromagnetic waves are applied to a human body, the quantity evaluation on the electromagnetic waves is performed by power measurement, electromagnetic field analysis and SAR measurement through animal tests and the like. In this case, the SAR is represented as absorption power per unit mass, which is absorbed in a human body exposed to an electromagnetic field in general.

CENELEC (Comit'e Europeen de Normalisation Electrotechnique) regulates SAR condition as the requirement for the suitability evaluation on a mobile communication user equipment as well as U.S. FCC. Thus, U.S. FCC, CENELEC and the like specify the SAR condition as an important item for the suitability evaluation on the mobile communication terminal despite differing in a reference value of the SAR condition. Therefore, the mobile communication terminal should meet the SAR condition or rules.

In general, a user equipment in a wireless communication system needs to abide by Specific Absorption Rate (hereinafter abbreviated SAR) rules even if transmitting signals on at least two frequency bands. For this, a user equipment according to a related art measures a power of a first frequency band and a power of a second frequency band and then saves the measured power values. And, the related art user equipment previously determines how much power will be backed off in accordance with the power of each of the two frequency bands. In this case, the value of the power to be backed off in accordance with the power of the corresponding frequency band is previously defined in such a format as a table and the like.

For instance, when a user equipment transmits a signal on a first frequency band with maximum power, a power of a second frequency band different from the first frequency band will apply to a power backoff as much as possible. Likewise, when the user equipment transmits a signal on the second frequency band with maximum power, a power of the first frequency band will apply to a power backoff as much as possible. Moreover, in case that a user equipment transmits a signal on one frequency band not with a maximum power but with a specific power value, a quantity of a power backoff, which will apply to the other frequency band is already determined in advance. In particular, Quantities of the power backoff, which will apply to various power values of a signal transmitted on the first or second frequency band, are defined as a table in advance.

In case of the real implementation of the above power backoff quantity, assuming that a transmission power of a signal transmitted on a specific frequency band is already known, a transmission power of a signal transmitted on another frequency band is measured by real time. And, the power backoff quantity previously defined for each of the two transmission power values is applied.

A power backoff reference applied in this scheme is implemented to apply a specific power back-of quantity to a value in a specific range instead of an absolute value. In case of this implementation, a measured transmission power value belongs to a specific section. If an initial value in a range of the section is compared to a last value in the range of the section, there is a contradiction that a backoff quantity is identical despite a power difference in-between. Hence, this contradiction causes a problem that application of an elaborate and precise power backoff is difficult. Moreover, when a range is determined with a sufficient margin, it causes another problem that an unnecessary power backoff is generated.

Even if a table for the power backoff is prepared in a manner of setting a specific section to a range of a small value to solve these problems, a section, to which a power backoff will be applied, varies despite a small error occurrence in a measurement of a power value in aspect of real implementation. Moreover, it is difficult and inconvenient to measure a power value by a fine unit.

Moreover, a method of measuring a transmission power of a first wireless communication chip and a method of delivering the measured transmission power to a second wireless communication chip have not been proposed in detail so far.

As mentioned in the forgoing description, a user equipment in a wireless communication system needs to abide by the SAR rules in case of transmitting signals, to which at least two different wireless communication schemes are respectively applied, simultaneously. While two wireless communication chips are transmitting signals with maximum power, in order to prevent a case that the SAR reference is exceeded, a power of the signal transmitted by one of the two wireless communication chips should be estimated. Yet, if it is impossible to perform initial transmission power estimation in a situation that open-loop power control is performed like RACH state, it causes a serious problem that the SAR is not met. And, a solution of this problem has not been proposed at all.

SUMMARY OF THE INVENTION

Accordingly, the present invention is directed to a user equipment apparatus for transmitting a plurality of signals simultaneously using at least two wireless communication schemes and a method thereof that substantially obviates one or more problems due to limitations and disadvantages of the related art.

An object of the present invention is to provide a user equipment apparatus for simultaneously transmitting a plurality of signals using at least two wireless communication schemes.

Another object of the present invention is to provide a method of simultaneously transmitting a plurality of signals using at least two wireless communication schemes.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a user equipment (UE) of a wireless communication system, the UE comprises a second receiving module, of a second wireless communication chip, configured for receiving a transmission power value of a first signal configured to be transmitted from a first wireless communication chip of the UE; and a second transmission power value determining module, of the second wireless communication chip, configured for determining a transmission power value of a second signal configured to be transmitted from the second wireless communication chip, the determination based on the received transmission power value of the first signal and a predefined specific absorption rate (SAR) condition, wherein the first wireless communication chip is configured for transmitting the first signal using a first wireless communication scheme, wherein the second wireless communication chip is configured for transmitting the second signal using a second wireless communication scheme simultaneously with the transmission of the first signal by the first wireless communication chip.

Preferably, the second transmission power value determining module is further configured for determining the transmission power value of the second signal using a preset maximum sum power value.

More preferably, the second transmission power value determining module comprises a difference value calculating module configured for calculating a value of a difference between the transmission power value of the first signal and the preset maximum sum power value; and a second transmission power value setting module configured for setting the transmission power value of the second signal to the calculated value of the difference between the transmission power value of the first signal and the preset maximum sum power value.

In this case, the difference value calculating module is further configured for calculating the value of the difference between the transmission power value of the first signal and the preset maximum sum power value in Watts; and the second transmission power value setting module is further configured for setting the transmission power value of the second signal as a decibel (dB) unit value corresponding to the value of the difference calculated in Watts.

And, the preset maximum sum power value is a maximum value of a sum of the transmission power value of the first signal and the transmission power value of the second signal.

The UE further comprises a first transmission power value measuring module, of the first wireless communication chip, configured for measuring the transmission power value of the first signal, wherein the second receiving module is further configured for receiving the measured transmission power value of the first signal from a first transmitting module of the first wireless communication chip or from an external environment of the first wireless communication chip.

In another aspect of the present invention, a method of simultaneously transmitting a plurality of signals via a user equipment (UE) in a wireless communication system using at least two wireless communication schemes, the method comprises receiving, via a second receiving module in a second wireless communication chip of the UE, a transmission power value of a first signal from a first wireless communication chip of the UE; and determining, via a second transmission power value determining module of the second wireless communication chip, a transmission power value of a second signal based on the received transmission power value of the first signal and a predefined specific absorption rate (SAR) condition, wherein the first signal is transmitted using a first wireless communication scheme, and wherein the second signal is transmitted using a second wireless communication scheme.

Preferably, the step of determining the transmission power value of the second signal comprises using a preset maximum sum power value.

More preferably, the step of determining the transmission power value of the second signal further comprises calculating, via a difference value calculating module of the second transmission power value determining module, a value of a difference between the transmission power value of the first signal and the preset maximum sum power value; and setting, via a second transmission power value setting module of the second transmission power value determining module, the transmission power value of the second signal to the calculated value of the difference between the transmission power value of the first signal and the preset maximum sum power value.

In this case, wherein the difference between the transmission power value of the first signal and the preset maximum sum power value is calculated in Watts; and the transmission power value of the second signal is set to a decibel (dB) unit value corresponding to the value of the difference calculated in Watts.

And, the preset maximum sum power value is a maximum value of a sum of the transmission power value of the first signal and the transmission power value of the second signal.

Preferably, the transmission power value of the first signal is transmitted in a next transmission timing.

In another aspect of the present invention, A user equipment (UE) of a wireless communication system includes a second receiving module, of a second wireless communication chip, configured for receiving communication mode information indicating whether a first wireless communication chip is in a communication mode for performing a random access channel (RACH) process for an access to a base station when the first wireless communication chip is transmitting a first signal; and a power value determining module, of the second wireless communication chip, configured for determining a transmission power value of a second signal based on the received communication mode information when the second signal is transmitted by the second wireless communication chip simultaneously with the transmission of the first signal by the first wireless communication chip, wherein the first wireless communication chip is configured for transmitting the first signal using a first wireless communication scheme, and wherein the second wireless communication chip is configured for transmitting the second signal using a second wireless communication scheme.

Preferably, the power value determining module is further configured for determining the transmission power value of the second signal by using a maximum transmission power value of the second signal and a maximum power back-off value of the second signal when the communication mode of the first wireless communication chip is the communication mode for performing the RACH process.

Preferably, the transmission power value of the second signal is determined by subtracting the maximum power back-off value of the second signal from the maximum transmission power value of the second signal.

Preferably, the first wireless communication chip comprises a communication mode determining module configured for determining whether the communication mode of the first wireless communication chip is the communication mode for performing the RACH process for the access to the base station; and a first transmitting module configured for transmitting the communication mode information to the second receiving module.

In a further aspect of the present invention, a method of simultaneously transmitting a plurality of signals via a user equipment (UE) in a wireless communication system using at least two wireless communication schemes, the method comprises receiving, via a second receiving module of a second wireless communication chip of the UE, communication mode information indicating whether a first wireless communication chip is in a communication mode for performing a random access channel (RACH) process for an access to a base station when the first wireless communication chip is transmitting a first signal; and determining, via a power value determining module of the second wireless communication chip, a transmission power value of a second signal based on the received communication mode information when the second signal is transmitted by the second wireless communication chip simultaneously with the transmission of the first signal by the first wireless communication chip, wherein the first wireless communication chip is configured for transmitting the first signal using a first wireless communication scheme, and wherein the second wireless communication chip is configured for transmitting the second signal using a second wireless communication scheme.

More preferably, determining the transmission power value of the second signal comprises using a maximum transmission power value of the second signal and a maximum power back-off value of the second signal when the communication mode of the first wireless communication chip is the communication mode for performing the RACH process; and the maximum power back-off value enables a power back-off to be performed on the second signal.

More preferably, determining the transmission power value of the second signal comprises subtracting the maximum power back-off value of the second signal from the maximum transmission power value of the second signal.

Preferably, the further comprises determining, via a communication mode determining module of the first wireless communication chip, whether the communication mode of the first wireless communication chip is the communication mode for performing the RACH process for the access to the base station; and transmitting, via a first transmitting module of the first wireless communication chip, the communication mode information to the second receiving module.

Accordingly, the present invention provides the following effects and/or advantages.

First of all, the present invention enables a user equipment to simultaneously transmit signals on different frequency bands by meeting the SAR rules using different wireless communication schemes.

Secondly, the present invention can determine a power back-off quantity accurately and efficiently in order to enable a user equipment to simultaneously transmit signals on a plurality of frequency bands efficiently using different wireless communication schemes, thereby preventing unnecessary power backoff.

Thirdly, when at least two signals having different wireless communication schemes applied thereto are simultaneously transmitted, even if unpredictable transmission power control is performed in a specific wireless communication chip, the present invention can meet the references of SAR.

Fourthly, the present invention enables an accurate and efficient transmission power control in case of simultaneously transmitting signals having different wireless communication schemes applied thereto. In particular, since the present invention can deliver a transmission power in a first wireless communication chip, which is to be transmitted in a next signal transmission timing, to a second wireless communication chip without a delay using an interface (e.g., GPIO interface), it is not necessary to give an additional power margin value in case of a power backoff in the second wireless communication chip. Therefore, the present invention enables an accurate power backoff to be performed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. In the following detailed description, the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

In the description of the present invention, a user equipment (UE) designates a mobile or fixed type communication device used by a user, such as a mobile station (MS), an advanced mobile station (AMS), mobile terminal and a mobile hand set. Also, a base station (BS) designates a random node that performs communication with the user equipment, and its examples include Node B, eNode B, and an access point (AP).

In a wireless communication system, a user equipment can receive a signal from a base station in downlink. And, the user equipment can transmit a signal in uplink as well. Information transmitted or received by the user equipment can include data and various kinds of control information. Moreover, various kinds of physical channels exist in accordance with the types and usages of the information transmitted or received by the user equipment.

The terminology 'wireless communication scheme' mentioned in the present invention can be called in various ways including radio access technology (RAT) scheme and the like. For example of the wireless communication scheme or the radio access technology scheme, there are code division multiple access (CDMA), wideband code division access (WCDMA), long term evolution (LTE) and the like.

Figure 1:
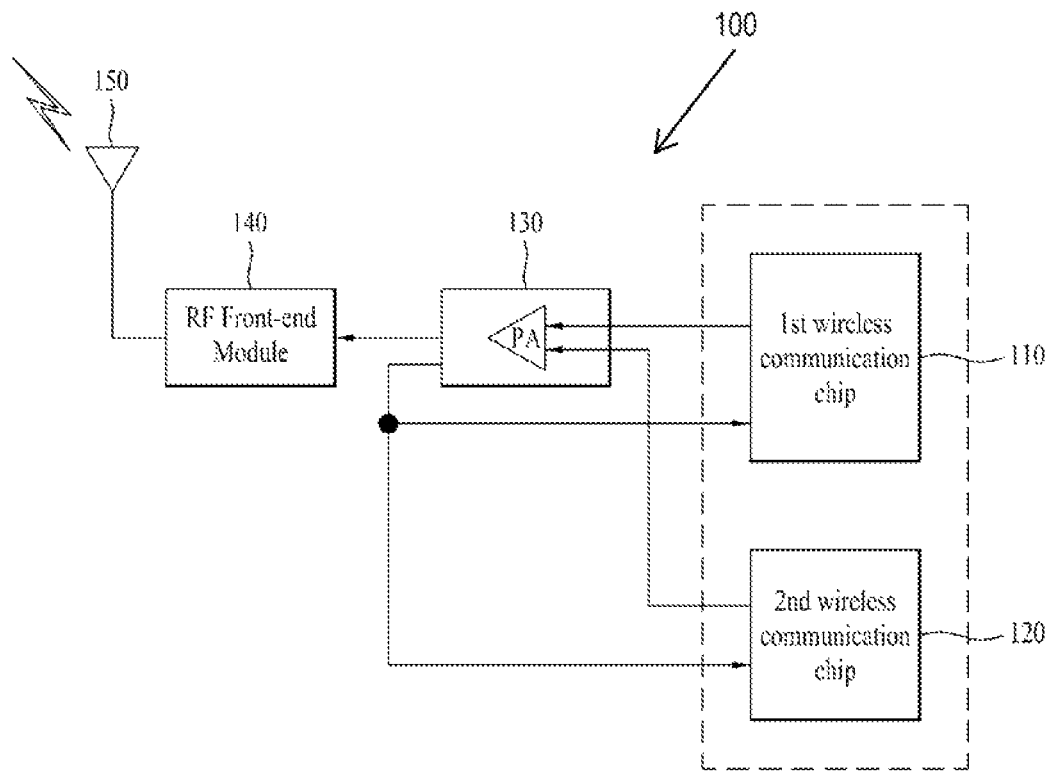
FIG. 1 is a block diagram for a user equipment according to an embodiment of the present invention.

FIG. 1 is a block diagram for a user equipment 100 according to one preferred embodiment of the present invention.

Referring to FIG. 1, a user equipment 100 can include a first wireless communication chip 110, a second wireless communication chip 120, a power amplifier 130, an RF front-end module 140 and an antenna 150.

In wireless communications, electromagnetic waves on a specific frequency band are used. Each of the first and second wireless communication chips 110 and 120 modulates an original signal (i.e., a baseband signal) into a signal on a high frequency band in a signal transmitting process and also demodulates a received high frequency signal into a baseband signal in a signal receiving process. Each of the first and second wireless communication chips 110 and 120 can be implemented with a 'radio frequency (RF) chip' that modulates a signal processed on a baseband into a signal on a high frequency band or an 'RF & baseband chip' implemented in a manner of combining a baseband chip configured to process a baseband signal with an RF chip configured to modulate a signal processed on a baseband into a high frequency band signal in a signal transmitting/receiving process or demodulate a received signal into a baseband signal by demodulating the received signal.

The first and second wireless communication chips 110 and 120, as shown in FIG. 1, is implemented with separate chips, respectively. Alternatively, both of the first and second wireless communication chips 110 and 120 can be implemented into a single chip.

As mentioned in the above description, each of the first and second wireless communication chips 110 and 120 performs a modulating/demodulating function in a manner of processing an original signal into a signal on a high frequency band in a signal transmitting process and also processing a signal on a high frequency band into a signal on a baseband in a signal receiving process.

In case that the user equipment 100 needs to simultaneously transmit signals from a plurality of the wireless communication chips 110 and 120 to which different wireless communication schemes are applied, respectively, the first wireless communication chip 110 performs a function of processing an original signal into a signal on a first frequency band and the second wireless communication chip 120 can perform a function of processing the original signal into a signal on a second frequency band, simultaneously. In particular, the user equipment 100 can transmit a signal in a signal transmitting process in a manner that the first and second wireless communication chips 110 and 120 modulate a signal into signals on different frequency bands.

An interface (not shown in the drawing) is connected to exchange information between components within the user equipment 100 as well as between the first wireless communication chip 110 and the second wireless communication chip 120.

The power amplifier (PA) 130 plays a role in amplifying the signal received from each of the first and second wireless communication chips 110 and 120 by being processed therein (e.g., processed into signals on different frequency bands).

The RF front-end module 140 can play a role in enabling free transmission and reception of the user equipment 100 and calls of the user equipment 100 in various environments. The RF front-end module 140 can separate transmitted/received signals in a manner of connecting each of the first and second wireless communication chips 110 and 120 to the antenna 150 in the user equipment 100. The RF front-end module 140 includes a receiving stage front-end module having a built-in received signal filtering filter as a module configured to play a filtering role and a transmitting stage front-end module having a built-in power amplifier 130 for amplifying a transmission signal as a mobile configured to play an amplifying role. The RF front-end module 140 is mainly used for a global system for mobile communications (GSM) user equipment of TDMA (time division multiple access) which should switch transmitted and received signals by switching them to each other.

The RF front-end module 140 may transmit signals on a multiple frequency band like the user equipment 100 according to the present invention. For instance, the RF front-end module 140 enables the user equipment 100 to use both of GSM and W-CDMA. If the above-described RF front-end module 140 is used, it is able to decrease the number of parts of the user equipment 100. And, it is able to raise the reliability of the user equipment 100. Moreover, it is able to reduce the loss due to the interconnections between the parts.

The RF front-end module 140 can remarkably improve the battery consumption by reducing power consumption and also enables multiple frequency bands and downsized parts of a multi-functional user equipment. The RF front-end module 140, as shown in FIG. 1, can transmit the signals, which are processed on a plurality of frequency bands and then received from the power amplifier 130, via the antenna 150, respectively.

The antenna 150 transmits signals to an external device (e.g., a base station). Although FIG. 1 shows only one antenna 150, the user equipment 100 can include a plurality of antennas. The RF (radio frequency) module can include the RF front-end module 140 and the antenna 150 as a module for transmitting signals to the base station and the like or receiving signals from the base station and the like.

Figure 2:
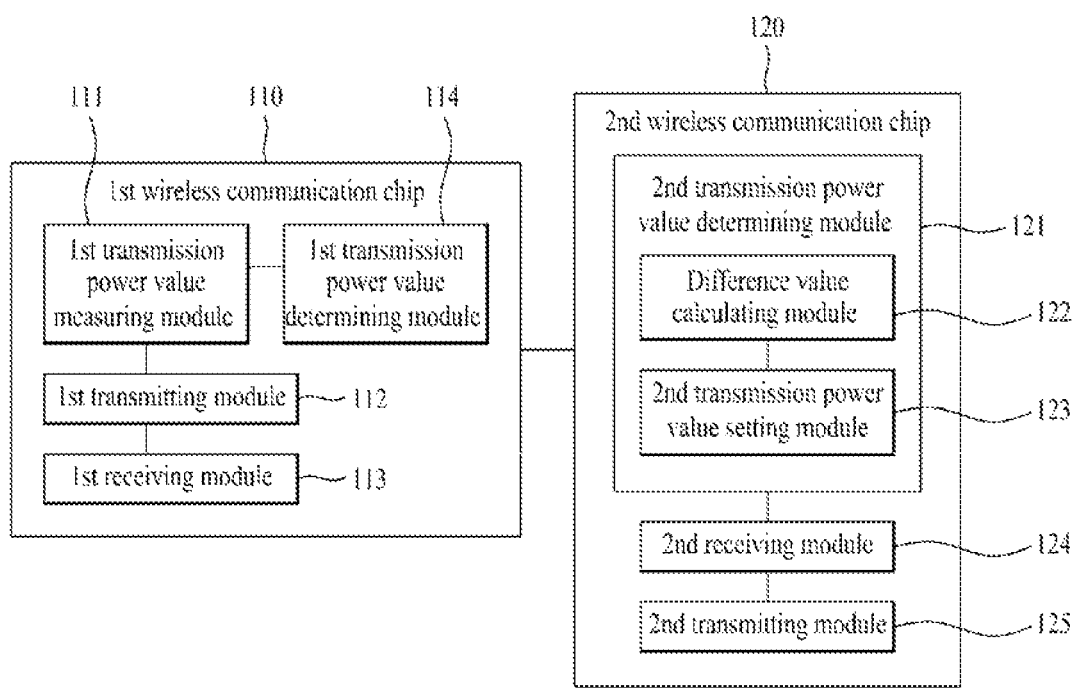
FIG. 2 is a block diagram of one example of a detailed configuration of a user equipment according to the present invention.

FIG. 2 is a block diagram of one example of a detailed configuration of a user equipment 100 according to the present invention.

Referring to FIG. 2, the first wireless communication chip 110 of the user equipment 100 according to the present invention may include a first transmission power value measuring module 111, a first transmitting module 112 and a first receiving module 113.

The first transmission power value measuring module 111 measures a transmission power value of a signal (hereinafter named a first signal) transmitted from the first wireless communication chip 110. The first transmission power value measuring module 111 can measure a transmission power value of a frequency band (e.g., the first signal (or a signal on a first frequency band) transmitted by the first wireless communication chip 110) that becomes a power measurement monitoring target among a plurality of frequency bands on which signals are simultaneously transmitted by the user equipment 100. The first transmission power value measuring module 111, as shown in FIG. 2, is situated within the first wireless communication chip 110. Yet, a module for measuring a transmission power value of a signal transmitted from the first wireless communication chip 110 can be provided outside the first wireless communication chip 110. In this case, a transmission power value of a signal transmitted from the first wireless communication chip 110 can be measured outside the first wireless communication chip 110 as well.

The first transmitting module 112 can transmit various data to an external device (e.g., the second wireless communication chip 120) as well as the transmission power value information measured by the first transmission power value measuring module 111. The first transmitting module 112 can transmit the first signal, which corresponds to the transmission power value measured by the first transmission power value measuring module 111, to the base station and the like. And, the first receiving module 113 can receive various data coming from external environment.

The second wireless communication chip 120 can include a second transmission power value determining module 121, a second receiving module 124 and a second transmitting module 125.

The second receiving module 124 can receive the transmission power value information of the first signal measured by the first transmission power value measuring module 111 from the first transmitting module 112. In case that the transmission power value of the first signal transmitted from the first wireless communication chip 110 is measured by a measuring module (not shown in the drawing) provided outside the first wireless communication chip 110, the second receiving module 124 can receive the transmission power value of the first signal, which was transmitted from the first wireless communication chip 110, from the measuring module (not shown in the drawing) provided outside the first wireless communication chip 110. And, the second receiving module 124 can receive various signals, data and information from the first transmitting module 112 and the like.

The second transmission power value determining module 121 can determine a transmission power value of a signal (hereinafter named a second signal) transmitted from the second wireless communication chip 120 by the second wireless communication scheme based on the transmission power value of the first signal received by the second receiving module 124 and the previously defined SAR (specific absorption rate) condition.

In this case, the previously defined SAR condition indicates the condition for regulating a specific absorption rate per unit mass absorbed in a human body if the human body is exposed to an electromagnetic field as a requirement for the suitability evaluation of a mobile communication terminal by FCC (Federal Communication Commission), CENELEC (The European Committee for Electrotechnical Standardization) and the like. As mentioned in the foregoing description, since such a commission or committee as FCC, CENELEC and the like requires the SAR condition for the suitability evaluation of the mobile communication terminal despite a difference in a reference value of the SAR condition, the user equipment 100 should meet the SAR rules. Hence, the second transmission power value determining module 121 can determine a transmission power value of a signal transmitted from the second wireless communication chip 120 by the second wireless communication scheme in order to prevent a transmission power sum of the signals (i.e., the first signal and the second signal) respectively transmitted from the first wireless communication chip 110 of the first wireless communication scheme and the second wireless communication chip 120 of the second wireless communication scheme from violating the SAR rules.

In doing so, the second transmission power value determining module 121 can determine the transmission power value of the second signal in a manner of further using a previously set maximum sum power value by meeting the previously defined SAR condition. In this case, the maximum sum power value (e.g., a value by a unit of Watt (W)) indicates a value that a sum of the transmission power values of the first and second signals becomes a maximum if the first signal transmitted from the first wireless communication chip 110 and the second signal transmitted from the second wireless communication chip 120 are simultaneously transmitted. In the following description, a method for the second transmission power value determining module 121 to determine the transmission power value of the second signal in a manner of further using a previously set maximum sum power value is explained.

First of all, the second transmission power value determining module 121 can further include a difference value calculating module 122 and a second transmission power value setting module 123. In this case, the difference value calculating module 122 can calculate a difference value between the transmission power value (e.g., a value by Watt unit) of the first signal and the previously set maximum sum power value. And, the second transmission power value setting module 123 can set the transmission power value of the second signal to the calculated power value. In doing so, as mentioned in the foregoing description, the difference value calculating module 122 can calculate the difference value into a value of the Watt unit. Moreover, the second transmission power value setting module 123 can set the transmission power value of the second signal to a value of decibel (dB) unit corresponding to the difference value of the Watt unit calculated by the difference value calculating module 122.

For instance, assume that a previously set SAR requirement condition is 1.3 W/kg. Assume that a transmission power value of a first signal measured by the first transmission power value measuring module 111 is 0.0064 W (18 dBm). And, assume that a previously set maximum sum power value is 0.352 W (25 dBm). The difference value calculating module 122 can calculate 0.251 W amounting to a difference between the previously set maximum power value 0.352 W and the transmission power value 0.0064 W of the measured first signal.

If so, the second transmission power value setting module 123 can set a transmission power value of a second signal to the power value calculated by the difference value calculating module 122. In particular, the second transmission power value setting module 123 can set the transmission power value of the second signal to the power value 0.251 W calculated by the difference value calculating module 122 like the above example. In doing so, the second transmission power value setting module 123 converts 0.251 W to a corresponding value of decibel (dB) unit and then can set the transmission power value of the second signal to the converted value.

If so, the second transmitting module 125 can transmit the second signal with 0.251 W (or the value of decibel unit corresponding to 0.251 W) set by the second transmission power value setting module 123.

Therefore, the user equipment 100 can simultaneously transmit the signals having different wireless communication schemes applied thereto via at least two wireless communication chips 110 and 120 on a plurality of frequency bands by meeting the SAR rules. For instance, the wireless communication scheme applied to the first frequency band for carrying the first signal is CDMA (code division multiple access) and the wireless communication scheme applied to the second frequency band for carrying the second signal is LTE (long term evolution). Thus, the user equipment 100 meets the SAR rules and is also able to simultaneously transmit the CDMA scheme applied signal and the LTE scheme applied signal on the first frequency band and the second frequency band, respectively.

Figure 3:
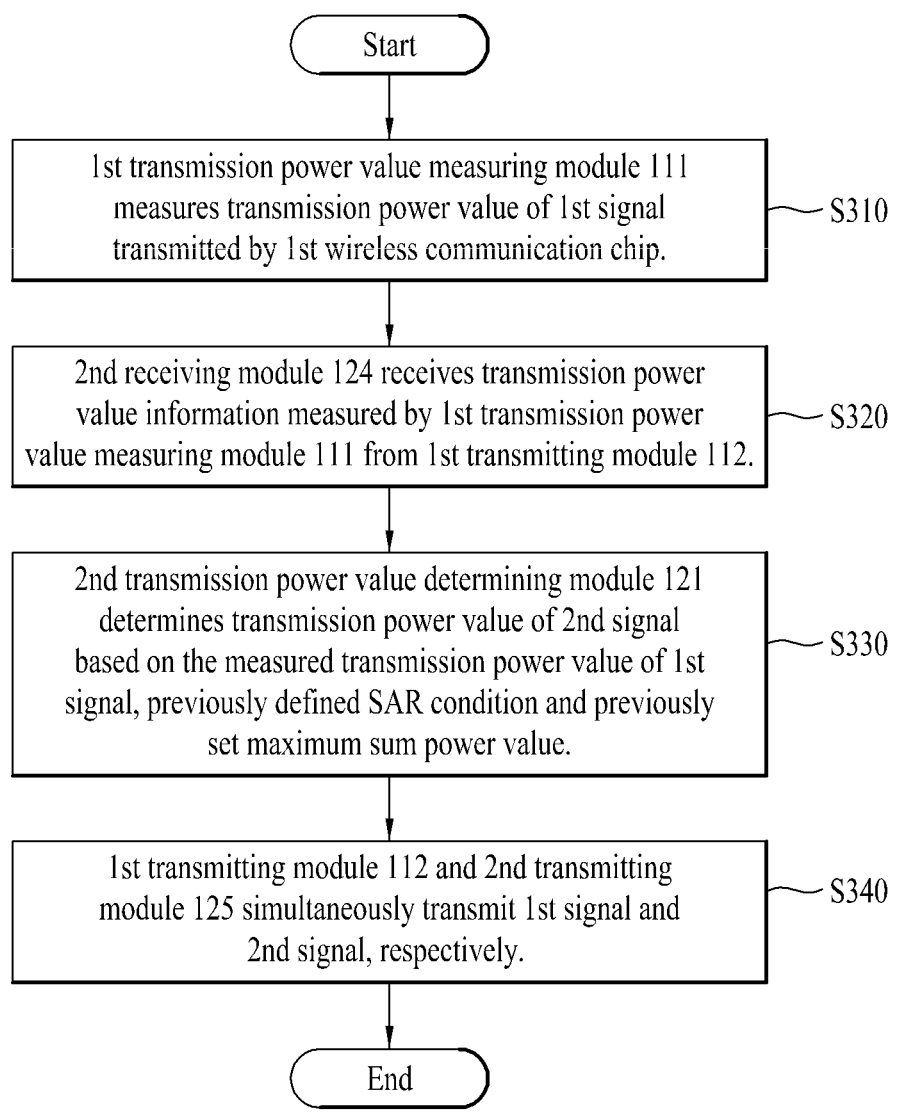
FIG. 3 is a flowchart for a method of controlling a power of a user equipment according to one preferred embodiment of the present invention.

FIG. 3 is a flowchart for a method of controlling a power of a user equipment 100 according to one preferred embodiment of the present invention.

Referring to FIG. 3, the first transmission power value measuring module 111 measures a transmission power value of a first signal transmitted from the first wireless communication chip 110 [S310]. The first transmitting module 112 can transmit the first signal as a transmission power value measured by the first transmission power value measuring module 111 [S320]. In particular, the second receiving module 124 can receive the transmission power value information measured by the first transmission power value measuring module 111 from the first transmitting module 112 [S320].

Subsequently, the second transmission power value determining module 121 can determine a transmission power value of a signal (hereinafter named a second signal) transmitted by the second wireless communication chip 120 using the second wireless communication scheme based on the transmission power value (i.e., the transmission power value of the signal transmitted from the first wireless communication chip 110) of the first signal received by the second receiving module 124 and the predefined electromagnetic waves SAR (specific absorption rate) condition [S330]. In particular, the second transmission power value determining module 121 can determine the transmission power value of the second signal in a manner of further using a preset maximum sum power value [S330].

How to determine the transmission power value of the second signal in the step S330 is schematically looked into as follows. First of all, the difference value calculating module 122 can calculate a difference value between the transmission power value (e.g., value of Watt unit) of the first signal and the previously set maximum sum power value (e.g., value of Watt unit). And, the second transmission power value setting module 123 can set the transmission power value of the second signal to the calculated power value. In doing so, the second transmission power value setting module 123 can set the transmission power value of the second signal to a value of decibel (dB) unit corresponding to the Watt-unit difference value calculated by the difference value calculating module 122.

Afterwards, the first transmitting module 112 and the second transmitting module 125 can simultaneously transmit the first signal and the second signal, respectively [S340].

As mentioned in the foregoing description, the first transmitting module 112 of the first wireless communication chip 110 forwards a current transmission power value of the first signal to the second wireless communication chip 120. If so, the second wireless communication chip 120 sets a transmission power value of a signal to transmit in a next signal transmission timing. In doing so, a time delay amounting to a sum of a time of transmission via interface and a time for the processing in the second wireless communication chip 120 can occur between a time corresponding to the transmission power value of the first wireless communication chip 110 and the transmission power value determined by the second wireless communication chip 120.

Thus, since it is probable that the current transmission power value in the first wireless communication chip 110 may be changed in the delay, the second wireless communication chip 120 needs to provide an additional power margin (i.e., a variance (which is changeable for the delay time) of the transmission power in the first wireless communication chip 110) in order to meet the SAR rules. Yet, it is disadvantageous in that the additional power margin may further lower the transmission power. And, it is disadvantageous in that an accurate power backoff may not be performed.

To overcome the above disadvantages, the first wireless communication chip 110, as shown in FIG. 2, may further include the first transmission power value determining module 114. The first transmission power value determining module 114 can determine a transmission power value of a signal which is to be transmitted by the first wireless communication chip 110 not in the current transmission timing but in a next transmission timing. And, the first transmission power value determining module 114 can determine whether a power backoff needs to be performed on a power value of the second signal, which is to be simultaneously transmitted in the next signal transmission timing from the second wireless communication chip 120 having the second wireless communication scheme applied thereto, based on the transmission power value of the first signal determined to be transmitted in the next transmission timing.

In case of determining that the power backoff needs not to be performed on the power value of the second signal to be transmitted from the second wireless communication chip 120 in accordance with the determined transmission power value of the first signal, the first transmission power value determining module 114 can determine not to perform the power backoff on the power value of the signal to be transmitted from the second wireless communication chip 120 in the next signal transmission timing. Thus, the information, which is determined not to perform the power backoff on the power value of the signal to be transmitted from the second wireless communication chip 120 in the next signal transmission timing, is forwarded to the first transmitting module 112. The first transmitting module 112 can then transmit the information to an external environment (e.g., the second wireless communication chip 120, an external device, an external module, etc.) via 1 bit of the interface. In particular, if the first transmission power value determining module 114 determines that the second wireless communication chip 120 needs not to perform the power backoff on the power value of the signal which is to be transmitted from the second wireless communication chip 120 in the next signal transmission timing, the transmitting module 112 can only transmit the information to an external environment (e.g., the second wireless communication chip 120, an external device, an external module, etc.) via 1 bit of the interface.

On the contrary, in case of determining that the power backoff needs to be performed on the power value of the second signal to be transmitted from the second wireless communication chip 120 in accordance with the determined transmission power value of the first signal, the first transmission power value determining module 114 can determine to perform the power backoff on the power value of the signal to be transmitted from the second wireless communication chip 120 in the next signal transmission timing. Thus, the information, which is determined to perform the power backoff on the power value of the signal to be transmitted from the second wireless communication chip 120 in the next signal transmission timing, and the determined transmission power value of the first signal are forwarded to the first transmitting module 112. The first transmitting module 112 can then transmit the information to an external environment (e.g., the second wireless communication chip 120, an external device, an external module, etc.) via interface. In particular, the first transmitting module 112 forwards the information indicating that the power backoff needs to be performed via 1 bit of the interface and can also forward the power backoff value or the determined transmission power value of the first signal via the rest of bits of the interface.

The above-described case corresponds to the case that the number of the GPIO interfaces is limited to a prescribed number. In particular, if the number of the GPIO interfaces is limited to a prescribed number, the first transmitting module 112 forwards the information indicating whether the power backoff needs to be performed via 1 bit (i.e., enable/disable bit) of the interface. If the power backoff needs to be performed, the first transmitting module 112 transmits the power backoff value or the determined transmission power value of the first signal via the rest of the bits of the interface.

On the contrary, if a number of GPIO interfaces are available, the first transmitting module 112 can transmit the transmission power value of the first signal determined by the first transmission power value determining module 114 to the external environment (e.g., the second receiving module 124, etc.) via at least one interface.

The interface is connected to exchange signals, information and the like between the first wireless communication chip 110 and the second wireless communication chip 120. For example, the interface may include a GPIO (general purpose input output) interface. In this case, the GPIO means a universal I/O and indicates a pin for enabling its function for various usages in accordance with how it is set in a program instead of being assigned to a special purpose like a rest pin, a ground pin, a clock pin and the like. If the GPIO is used, it is able to receive a key input or control a specific device. When a specific situation takes place in software, a specific device can be activated using the GPIO.

In the GPIO, pin states of 2 kinds of modes including an input and an output exist. Of course, both of the pin states do not exist at the same time. And, a programmer sets the input state or the output state in general. Therefore, it is mandatory for the programmer to perform the setting on the GPIO to use. Recently, 32-bit MCU having 40 pins only can support 200 functions, which is because a single GPIO is capable of supporting plural functions.

Meanwhile, the second receiving module 124 of the second wireless communication chip 120 can receive the information determined by the first transmission power value determining module 114 from the first transmitting module 112 via the interface. In this case, the second receiving module 124 exists in a power value measuring device or module outside the first wireless communication chip 110 and can receive the measured power value of the signal transmitted from the first wireless communication chip 110 via another interface and the like.

If the number of the GPIO interfaces is limited to a prescribed number, the second receiving module 124 receives the information indicating whether the power backoff needs to be performed via 1 bit (i.e., enable/disable bit) of the interface. If the power backoff needs to be performed, the second receiving module 124 can receive the power backoff value or the determined transmission power value of the first signal via the rest of the bits of the interface.

On the contrary, if a number of GPIO interfaces are available, the second receiving module 124 can receive the transmission power value of the first signal determined by the first transmission power value determining module 114 via at least one interface.

Meanwhile, the second transmission power value determining module 121 can determine a transmission power value of a second signal, which is to be transmitted in a next signal transmission timing from the second wireless communication chip 120, based on the information on the transmission power of the first signal received by the second receiving module 124.

In case that a number of the GPIO interfaces are available, the second transmission power value determining module 121 can determine a transmission power value of a second signal, which is to be transmitted in a next signal transmission timing from the second wireless communication chip 120 simultaneously with the first signal, using the power value of the first signal received by the second receiving module 124 and a preset power backoff value corresponding to the power value of the received first signal.

In this case, the preset power backoff value is determined to meet a predefined electromagnetic waves SAR condition when the first and second wireless communication chips 110 and 120 simultaneously transmit the first and second signals in the next signal transmission timing, respectively. In particular, a transmission power value, which is to be assigned to the second signal to be transmitted by the second wireless communication chip 120 in a next timing, is determined by performing the power backoff based on a power value set for the first signal to be transmitted by the first wireless communication chip 110 in the next timing.

Table 1 shows one example of a transmission power value (unit of dBm) possible in case that a plurality of the wireless communication chips 110 and 120, to which different wireless communication schemes are applied, respectively, in the user equipment 100 simultaneously transmit signals.

TABLE 1

|  | 1$^{st}$ wireless communication chip | 2$^{nd}$ wireless communication chip |
|---|---|---|
| Max. transmission power value (dBm) | 23 | 23 |
| Example of transmission power value (dBm) | 22 | 22 |
|  | 21 | 21 |
|  | 20 | 20 |
|  | 19 | 19 |
|  | 18 | 18 |

Referring to Table 1, a maximum transmission power value transmittable by each of the wireless communication chips 110 and 120 can be set previously. For example, the maximum wireless communication chip may be 23 dBm. Each of a plurality of the wireless communication chips 110 and 120 in the user equipment 100 can transmit a signal with a power value of maximum 23 dBm. Yet, if a plurality of the wireless communication chips 110 and 120 simultaneously transmit signals with 23 dBm, it violates the SAR rules. Hence, if a power value set for a signal to be transmitted by the first wireless communication chip 110 in a next timing is a maximum transmission power value of 23 dBm, a power value for a transmission from the second wireless communication chip 120 need to be smaller than 23 dBm. In particular, in order to meet the SAR rules, the transmission power value of the second wireless communication chip 120 needs to be power backed off from a maximum transmission power value in accordance with the transmission power value of the first wireless communication chip 110.

Table 2 shows one example of a maximum transmission power value for a transmission power value of the second wireless communication chip 120 in accordance with a transmission power value of the first wireless communication chip 110 to meet the SAR rules.

TABLE 2

| Example (dBm) of transmission power value of $1^{st}$ wireless communication chip | Example (dBm) of transmission power value of $1^{st}$ wireless communication chip | Example (dBm) of transmission power value of $1^{st}$ wireless communication chip |
| --- | --- | --- |
| 23 | 18 | 5 |
| 22 | 19 | 4 |
| 21 | 20 | 3 |
| 20 | 21 | 2 |
| 19 | 22 | 1 |
| 18 | 23 | 0 |

Referring to Table 2, it is able to previously set transmission power values of transmission signals in first and second wireless communication chips 110 and 120 to meet the SAR conditions. For instance, in Table 2, if a transmission power value of a first signal, which is to be transmitted from the first wireless communication chip 110 in a next signal transmission timing, is a maximum transmission power value of 23 dBm, the second transmission power value determining module 121 can determine a power value of a signal to transmit as 18 dBm by performing a power backoff on a transmission power value of a second signal to be transmitted from the second wireless communication chip 120 in the next signal transmission timing. In particular, the second transmission power value determining module 121 determines the power value of the signal to be transmitted into 18 dBm by performing the power backoff on the 23 dBm of the maximum transmission power value by 5 dBm. Namely, the power-backed off value is 5 dBm.

When the first wireless communication chip 110 and the second wireless communication chip 120 simultaneously transmit signals, assume that the first wireless communication chip 110 is the chip for transmitting signals by applying CDMA thereto. And, assume that the second wireless communication chip 120 is the chip for transmitting signals by applying LTE thereto. On these assumptions, the first wireless communication chip 110 mainly transmits audio signals and the second wireless communication chip 120 mainly transmits data signals. In case that the user equipment 100 simultaneously transmits both of the audio signal and the data signal, since a priority is generally given to the wireless communication for audio signal transmission in aspect of transmission power, the second transmission power value determining module 122 can determine a transmission power value of a signal to be transmitted from the second wireless communication chip 120 in a next timing simultaneously in accordance with a power value of a first signal to be transmitted by the first wireless communication chip 110 in the next timing, and vice versa.

Like those values shown in Table 2, the second transmission power value determining module 121 determines a value for backing off a power of a signal to be transmitted from the second wireless communication chip 120 and is then able to determine a transmission power value in accordance with the determined value. Subsequently, the first transmitting module 112 and the second transmitting module 125 are able to simultaneously transmit a first transmission power value determined by the first transmission power value determining module 114 and a second transmission power value determined by the second transmission power value determining module 121 in a next transmission timing, respectively.

In case that the number of the GPIO interfaces is limited to a prescribed number, the second transmission power value determining module 121 determines a transmission power value of a second signal, which is to be transmitted in a next signal transmission timing, in a manner of performing a power backoff only if the power backoff is necessary based on the information on whether the power backoff needs to be performed, which is received by the second receiving module 124 via 1 bit (enable/disable bit) of the interface. In particular, the second transmission power value determining module 121 determines the transmission power value of the second signal by performing the power backoff only if the second receiving module 124 receives the information indicating that the power backoff is needed via the enable bit (i.e., 1 bit) of the interface. If the second receiving module 124 does not receive the information indicating that the power back-off needs to be performed via the disable bit (i.e., 1 bit) of the interface, the second transmission power value determining module 121 does not perform the power backoff on the power value of the second signal which is to be transmitted in a next signal transmission timing. In this case, the second transmission power value determining module 121 can determine a next timing transmission power value of the second signal into a maximum transmission power value (e.g., 23 dBm).

In the above description, the second receiving module 124 and the second transmission power value determining module 121 are implemented within the second wireless communication chip 120. Alternatively, the second receiving module 124 and the second transmission power value determining module 121 can be implemented in a separate device or module.

Figure 4:
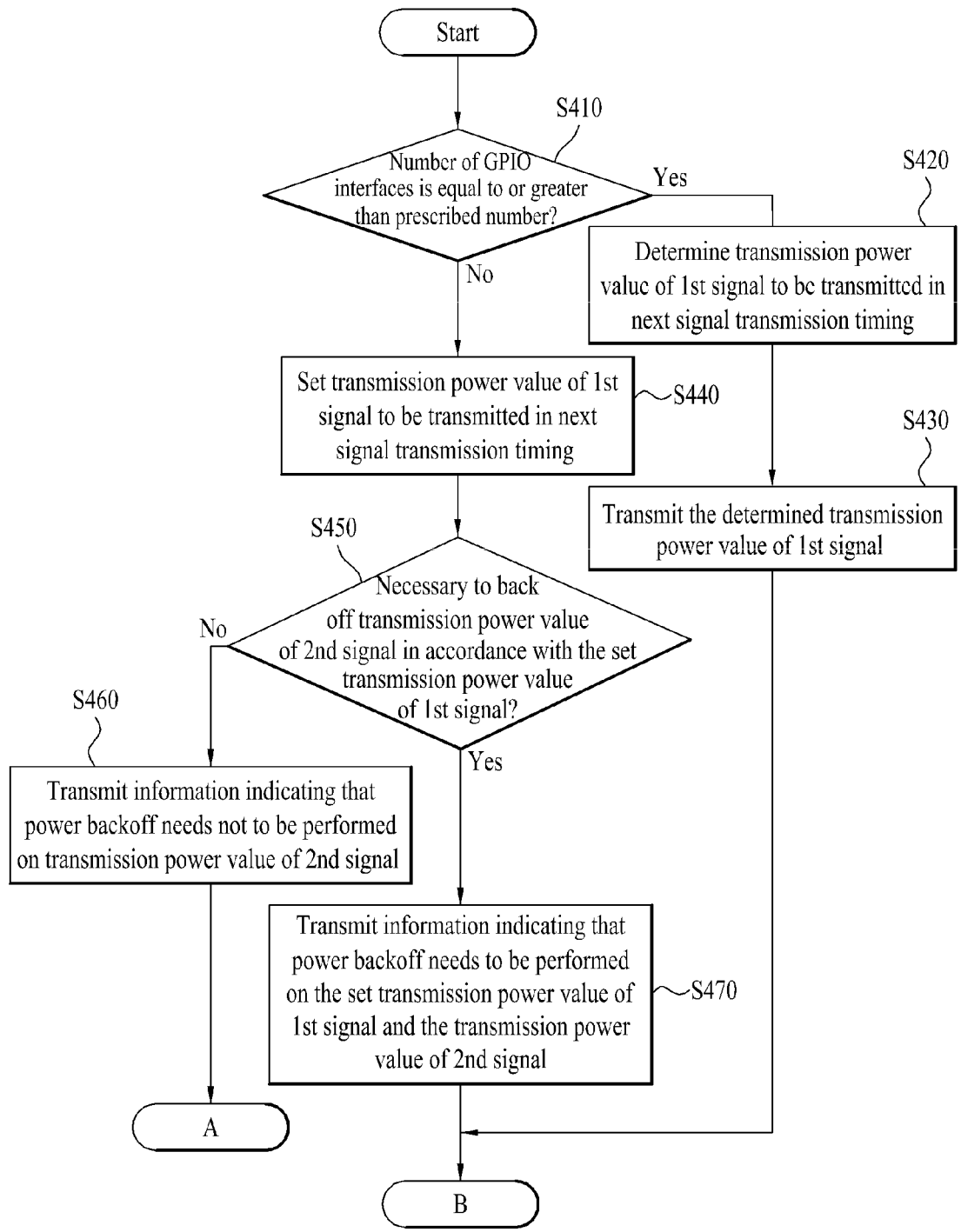
FIG. 4 is a flowchart for a method of controlling a power of a user equipment according to another preferred embodiment of the present invention.

FIG. 4 is a flowchart for a method of controlling a power of a user equipment 100 according to another preferred embodiment of the present invention.

Referring to FIG. 4, the first wireless communication chip 110 determines whether the number of interfaces (e.g., GPIO interfaces) for signal and information exchanges with the second wireless communication chip 120 is equal or greater than a prescribed number [S410]. In particular, a method of controlling a power of the user equipment 100 can vary in accordance with whether the number of the interfaces is equal or greater than the prescribed number.

First of all, if the number of the interfaces is equal to or greater than the prescribed number (i.e., if more interfaces are available) [S410], the first transmission power value determining module 114 can determine a transmission power value of a first signal to be transmitted not in a current signal transmission timing but in a next signal transmission timing

[S420]. And, the first transmission power value determining module 114 can determine a power backoff value for backing off a power for a signal to be transmitted by the second wireless communication chip in accordance with the transmission power value of the first signal to be transmitted in the next signal transmission timing [S425]. If so, the first transmitting module 112 can transmit the transmission power value of the first signal or the power backoff value in a determined next timing to an external environment (e.g., the second wireless communication chip 120, an external device, an external module, etc.) [S430].

On the contrary, if the number of the interfaces is smaller than the prescribed number (e.g., if limitation is put on the number of available interfaces) [S410], the first transmission power value determining module 114 can set a transmission power value of a first signal to be transmitted in a next signal transmission timing [S440]. And, the first transmission power value determining module 114 can determine whether a power backoff needs to be performed on a transmission power value of a second signal to be simultaneously transmitted by the second wireless communication chip 120 in a next signal transmission timing in accordance with the set transmission power value of the first signal [S450]. If the first transmission power value determining module 114 determines that the power backoff needs not to be performed [S450], the first transmitting module 112 can transmit information indicating that the power backoff is not necessary for the second signal to be transmitted in the next signal transmission timing to an external environment (e.g., the second wireless communication chip 120, an external device, an external module, etc.) [S460]. On the contrary, if the first transmission power value determining module 114 determines that the power backoff needs to be performed [S450], the first transmitting module 112 can transmit the determined transmission power value of the first signal and the information indicating that the power backoff needs to be performed on the second signal to the external environment [S470].

Figure 5:
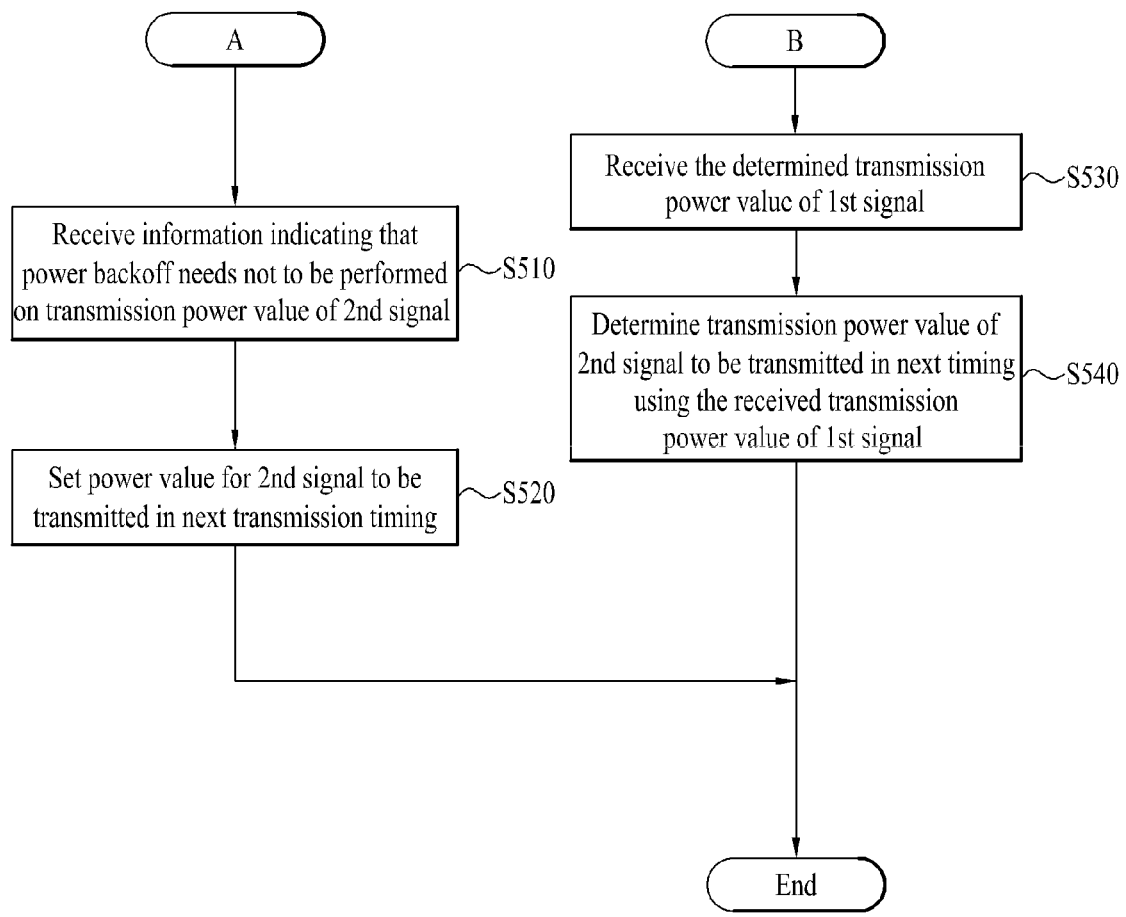
FIG. 5 is a flowchart of a process for following the power controlling method of the user equipment according to the present invention shown in FIG. 4.

FIG. 5 is a flowchart of a process for following the power controlling method of the user equipment 100 according to the present invention shown in FIG. 4.

Referring to FIG. 5, the second receiving module 124 can receive the information indicating that the power backoff needs not to be performed on the second signal to be transmitted by the second wireless communication chip 120 in the next signal transmission timing [S510]. If so, the second transmission power value determining module 121 does not perform the power backoff. Specifically, in this case, the second transmission power value determining module 121 can allocate a maximum transmission power value in the second wireless communication chip 120 as a transmission power value of the second signal to be transmitted in the next signal transmission timing.

On the contrary, the second receiving module 124 can receive the transmission power value of the first signal, which is determined to be transmitted by the first wireless communication chip 110 in the next signal transmission timing, via the interface [S530]. If so, the second transmission power value determining module 121 can determine a transmission power value of a second signal to be transmitted in a next timing using the transmission power value of the first signal received by the second receiving module 124 [S540]. In this case, the second transmission power value determining module 121 can determine the transmission power value of the second signal to be transmitted in the next timing in a manner of performing the power backoff on a maximum transmission power value of the second signal preset in accordance with the transmission power value of the first signal [S540].

Figure 6:
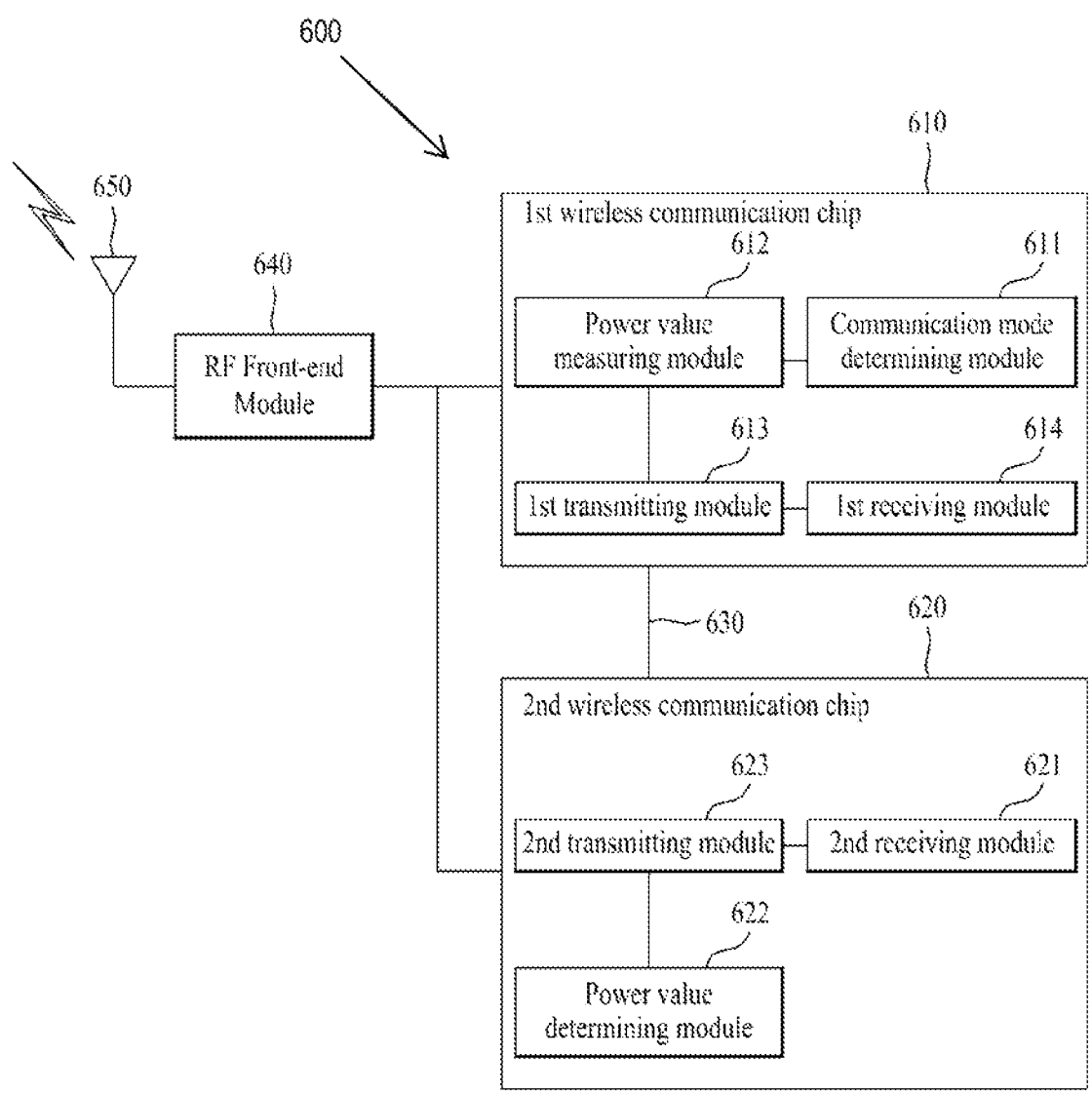
FIG. 6 is a diagram for one example of a user equipment according to another embodiment of the present invention.

FIG. 6 is a diagram for one example of a user equipment according to another embodiment of the present invention.

Referring to FIG. 6, a user equipment 600 can include a first wireless communication chip 610, a second wireless communication chip 620, an interface 630, an RF front-end module 640 and an antenna 650. In particular, according to the present embodiment, the first wireless communication chip 610 may include a communication mode determining module 611, a power value measuring module 612, a first transmitting module 613 and a first receiving module 614. And, the second wireless communication chip 620 may include a second receiving module 621, a second transmission second transmission power value determining module 622 and a second transmitting module 623.

The communication mode determining module 611 of the first wireless communication chip 610 determines whether a communication mode for operation of the first wireless communication chip 610 is the communication mode for performing a random access channel (RACH) process for an access to a base station.

Figure 7:
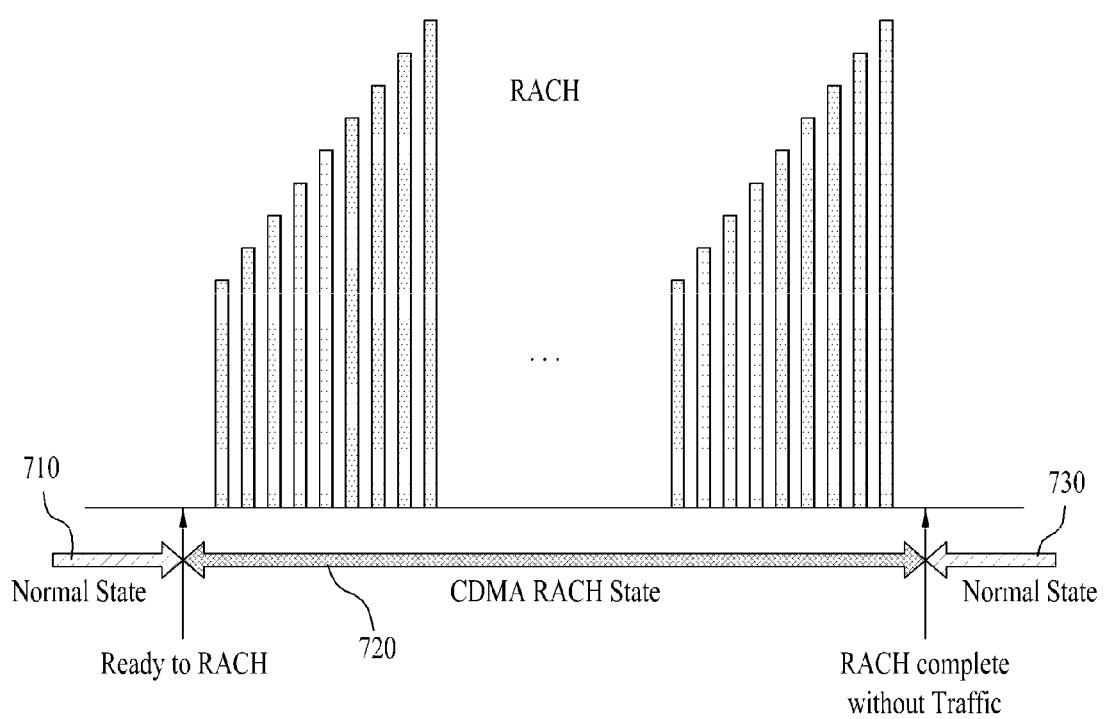
FIG. 7 is a diagram for one example of a communication mode state of a first wireless communication chip.

FIG. 7 is a diagram for one example of a communication mode state of the first wireless communication chip 610.

Referring to FIG. 7, a communication mode state of the first wireless communication chip 610 can be classified into a Random Access Channel (RACH) state and a normal state that is not the RACH state. In the normal state 710, the first wireless communication chip 610 transmit/receive normal audio signals with a base station. If the first wireless communication chip 610 in the normal state determines that the RACH process is necessary, the first wireless communication chip 610 can shift the state to the RACH state 720. If the state is shifted to the RACH state 720, the first wireless communication chip 610 of the user equipment 600 failing to access the base station transmits a probe to attempt an access to the base station using a random access scheme (e.g., a CDMA chip uses a slotted ALOHA random access scheme). If the probe fails in transmission, the first wireless communication chip 610 repeatedly transmits the probe by raising a probe output gradually until the access is successful. When the first wireless communication chip 610 transmits an access channel, it is able to transmit a preamble part for synchronization acquisition in a base station by adding a message part to the preamble part. Yet, according to this scheme, since a preamble is not correctly received by the base station, if there is no possibility in message reception, a message is transmitted. Therefore, radio section interference increases to reduce radio capacity.

The first wireless communication chip 610 repeatedly transmits the probe until receiving a response from the base station. Although FIG. 7 shows that the repetition of raising the probe output to the maximum is performed twice, the repetition can be performed until the response is received from the base station. In particular, in the RACH state 720, the first wireless communication chip 610 transmits the probe by raising the output (i.e., transmission output) gradually.

After the response has been received from the base station, if it is determined that it is necessary to shift the current state to the normal state 730, the first wireless communication chip 610 can transit to the normal state 730 again. In doing so, referring to FIG. 7, in case that there is no reverse traffic after the RACH state 720, the first wireless communication chip 610 can transit to the normal state 730 right after completion of the RACH state.

Figure 8:
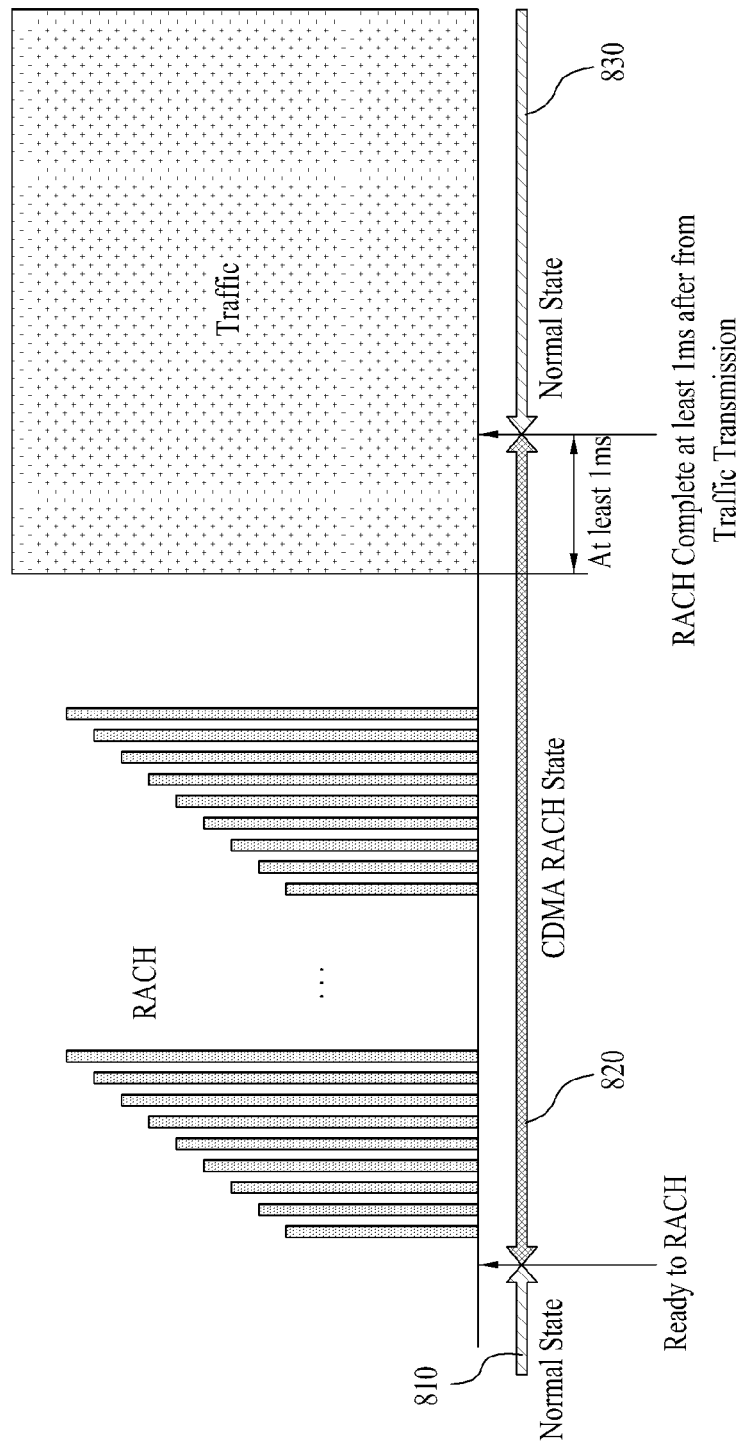
FIG. 8 is a diagram for another example of a communication mode state of a first wireless communication chip.

FIG. 8 is a diagram for another example of a communication mode state of the first wireless communication chip 610.

Referring to FIG. 8, a communication mode state of the first wireless communication chip 610 can be classified into an RACH state 820 and a normal state 810/830 that is not the RACH state 820. Unlike the case shown in FIG. 7, if there is a reverse traffic after the RACH state 820, the first wireless communication chip 610 completes the RACH state 820 after a specific time elapse (e.g., at least 1 ms) from a traffic transmission and is then able to make a transition to the normal state.

Figure 9:
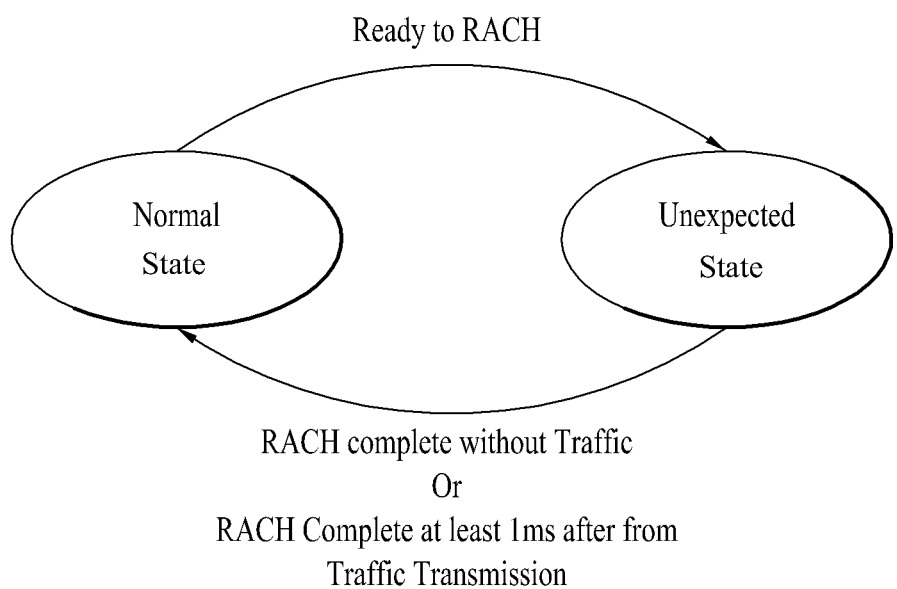
FIG. 9 is a diagram for transition of a communication mode state of a first wireless communication chip.

FIG. 9 is a diagram for transition of a communication mode state of the first wireless communication chip 610.

Referring to FIG. 9, when the first wireless communication chip 610 is in the normal state for exchanging signals and information with a base station, if an access to a base station is disconnected due to a diminishing strength of a signal or the like, the first wireless communication chip 610 makes a transition to the RACH state (or an unexpected state). Thereafter, if the first wireless communication chip 610 receives a response from the base station in the RACH state, the first wireless communication chip 610 can transit to the normal state again.

If there is no reverse traffic after the RACH state, the first wireless communication chip 610 makes a transition to the normal state right after the completion of the RACH state. Yet, if there is a reverse traffic after the RACH state, the first wireless communication chip 610 can transit to the normal state after an elapse of at least 1 ms after transmission of the reverse traffic.

Thus, the communication mode determining module 611 determines whether the communication mode in which the first wireless communication chip 610 is operating is the RACH state mode for the access to the base station or the normal state mode.

The power value measuring module 612 measures a transmission power value for transmitting a signal to which the first wireless communication scheme (e.g., CDMA scheme) is applied by the first wireless communication chip 610. The power value measuring module 612 can measure a transmission power value if it is necessary to simultaneously transmit at least two signals having different wireless communication schemes applied thereto, respectively. In doing so, the power value measuring module 612 can measure a transmission power value in a predetermined cycle while the at least two signals having the different wireless communication schemes applied thereto are simultaneously transmitted.

In this case, the power value measuring module 612 within the first wireless communication chip 610 measures a transmission power of the signal transmitted by the first wireless communication chip 610, by which the present embodiment is non-limited. For example, a power value measuring device or module (not shown in the drawing) outside the first wireless communication chip 610 can measure a transmission power value of a signal to be transmitted by the first wireless communication chip 610.

The first transmitting module 613 can transmit the communication mode information determined by the communication mode determining module 611 via the interface 630 to an external environment (e.g., the second wireless communication chip 620, an external device, an external module, etc.) outside the first wireless communication chip 610. Moreover, the first transmitting module 613 can transmit the transmission power value of the first wireless communication chip 610, which is measured by the power value measuring module 612, to the external environment (e.g., the second wireless communication chip 620, the external device, the external module, etc.). And, the first receiving module 614 can receive various data, various information and the like from an inside or outside of the first wireless communication chip 610.

The second receiving module 621 of the second wireless communication chip 620 can receive the communication mode information determined by the communication mode determining module 611 from the first transmitting module 613. Moreover, the second receiving module 621 can receive the transmission power value of the first wireless communication chip 610, which is measured by the power value measuring module 612, from the first transmitting module 613 via the interface 630. For another example, the second receiving module 621 exists in a power value measuring device or module outside the first wireless communication chip 610 and can receive the measured power value of the signal transmitted by the first wireless communication chip 610 via another interface or the like.

In case that the first wireless communication chip 610 and the second wireless communication chip 620 for transmitting a signal having a second wireless communication scheme applied thereto transmit signals simultaneously, the second transmission power value determining module 622 can determine a power value of a signal to be transmitted by the second wireless communication chip 620. In doing so, the second transmission power value determining module 622 can determine the transmission power value of the signal, which is to be transmitted by the second wireless communication chip 620, based on the information on the communication mode state of the first wireless communication chip 610, which is received by the second receiving module 621.

If the communication mode state of the first wireless communication chip 610 received by the second receiving module 621 is the communication mode for performing the RACH process, the second transmission power value determining module 622 can determine the transmission power value of the signal, which is to be transmitted by the second wireless communication chip 620, using the maximum transmission power value of the signal to be transmitted by the second wireless communication chip 620 and the maximum power backoff value of the signal to be transmitted by the second wireless communication chip 620.

In particular, the second transmission power value determining module 622 can determine the transmission power value of the signal to be transmitted by the second wireless communication chip 620 as a value resulting from subtracting the maximum power backoff value of the signal to be transmitted by the second wireless communication chip 620 from the maximum transmission power value of the signal to be transmitted by the second wireless communication chip 620. In this case, the maximum power backoff value of the signal to be transmitted by the second wireless communication chip 620 can be previously set. For instance, the maximum power backoff value of the signal to be transmitted by the second wireless communication chip 620 can include 4 dBm or 5 dBm.

If the communication mode state of the first wireless communication chip 610 received by the second receiving module 621 is not the communication mode for performing the RACH process, the second transmission power value determining module 622 can determine the transmission power value of the signal, which is to be transmitted by the second wireless communication chip 620, corresponding to the transmission power value of the signal (received by the second receiving module 621) which is already transmitted or is to be transmitted by the first wireless communication chip 610. In particular, the second transmission power value determining module 622 can determine the transmission power value of the signal to be transmitted by the second wireless communication chip 620 as the value resulting from subtracting the power backoff value previously determined in accordance with the transmission power value measured for the signal transmitted by the first wireless communication chip 610 from the maximum transmission power value of the signal to be transmitted by the second wireless communication chip 620. A method of performing a power backoff is similar to the former method in the description with reference to Table 1 or Table 2. A transmission power value of a second signal, which is to be transmitted by the second wireless communication chip 620, is determined as the value calculated in a manner of subtracting a previously determined power backoff value corresponding to the transmission power value measured for the signal transmitted by the first wireless communication chip 610 from the maximum transmission power value of the second signal.

In case that the first wireless communication chip 610 and the second wireless communication chip 620 simultaneously transmit signals, assume that the first wireless communication chip 610 is the chip for transmitting signals by applying CDMA thereto. And, assume that the second wireless communication chip 620 is the chip for transmitting signals by applying LTE thereto. On these assumptions, the first wireless communication chip 610 mainly transmits audio signals and the second wireless communication chip 620 mainly transmits data signals. In case that the user equipment 600 simultaneously transmits both of the audio signal and the data signal, since a priority is generally given to the wireless communication for audio signal transmission in an aspect of transmission power, the second transmission power value determining module 622 can determine a transmission power value of a signal to be transmitted from the second wireless communication chip 620 in accordance with a power value of a signal transmitted by the first wireless communication chip 610. The second transmission power value determining module 622 determines the value for backing off a power of a signal to be transmitted by the second wireless communication chip 620, as shown in Table 2, and is then able to determine a transmission power value in accordance with the determined power backoff value.

If so, the second transmitting module 613 can externally perform a transmission with the power value determined by the power value determining module 622.

In the above description, the second receiving module 621 and the second transmission power value determining module 622 are implemented within the second wireless communication chip 620. Alternatively, the second receiving module 621 and the second transmission power value determining module 622 can be implemented in a separate device or module.

An interface 630 is connected to exchange signals and information between the first wireless communication chip 610 and the second wireless communication chip 620. For example, the interface 630 includes a GPIO. A power amplifier (not shown in the drawing) plays a role in amplifying the signal received from each of the first and second wireless communication chips 610 and 620 by being processed therein (e.g., processed into signals on different frequency bands). An RF front-end module 640 can play a role in enabling free transmission and reception of the user equipment 600 and calls of the user equipment 600 in various environments. The RF front-end module 640 has the same function of the former RF front-end module in the user equipment 100 described with reference to FIG. 1.

Figure 10:
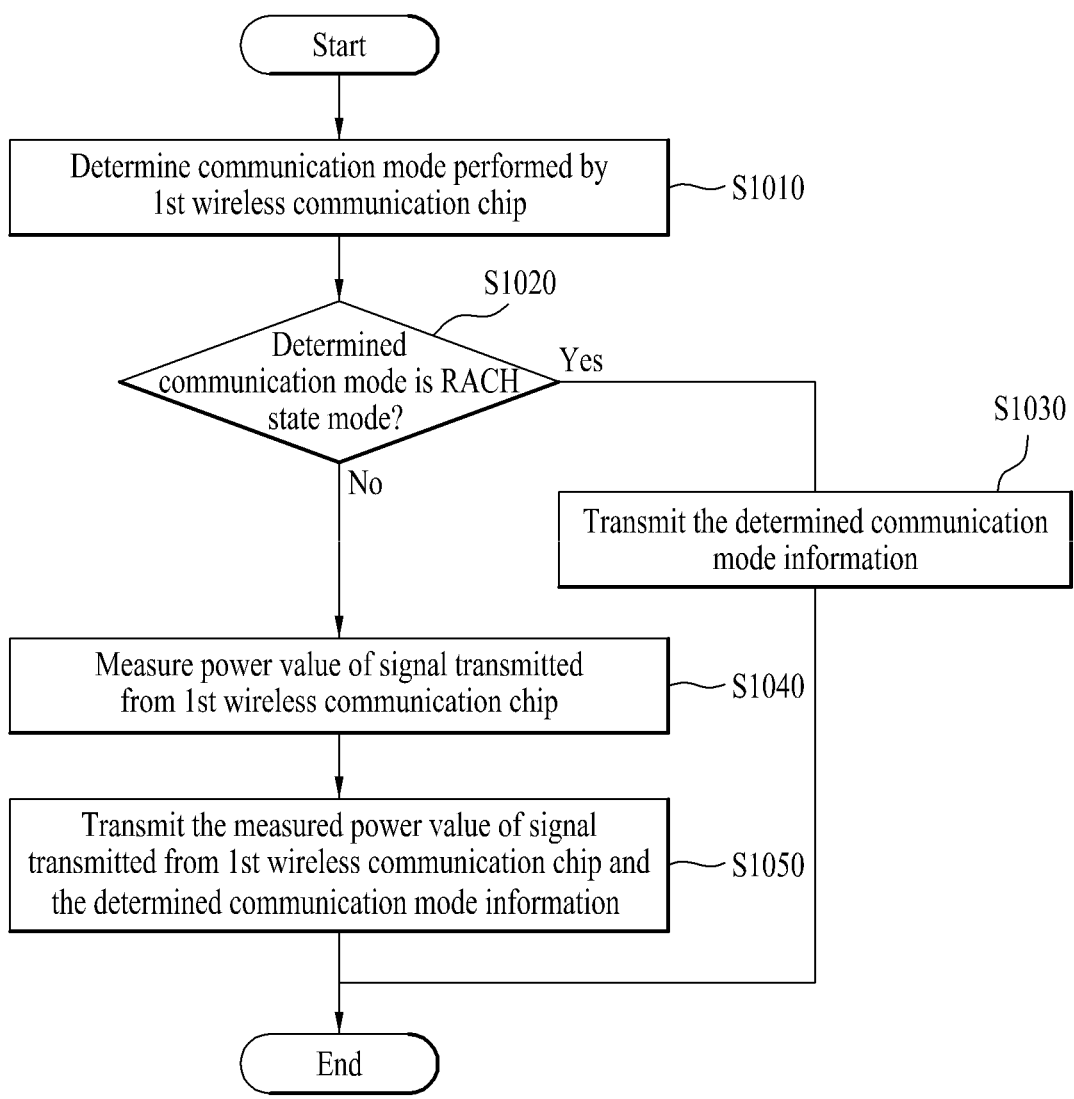
FIG. 10 is a diagram of a process for controlling a power of a user equipment in a first wireless communication chip according to the present invention.

FIG. 10 is a diagram of a process for controlling a power of the user equipment 600 in the first wireless communication chip 610 according to the present invention.

Referring to FIG. 10, the communication mode determining module 611 of the first wireless communication chip 610 determines a communication mode currently performed by the first wireless communication chip 610 [S1010]. If the communication mode determining module 611 determines that the current communication mode of the first wireless communication chip 610 is RACH state mode [S1020], the first transmitting module 613 transmits information on the determined communication mode to an external environment (e.g., the second wireless communication chip, etc.) via the interface 630 [S1030]. Yet, if the communication mode determining module 611 determines that the current communication mode of the first wireless communication chip 610 is not the RACH state mode [S1020], the power value measuring module 612 measures a power value of a signal transmitted by the first wireless communication chip 610 [S1040]. Thereafter, the first transmitting module 613 transmits the information on the determined communication mode and the measured power value information to the external environment (e.g., the second wireless communication chip, etc.) [S1050].

Figure 11:
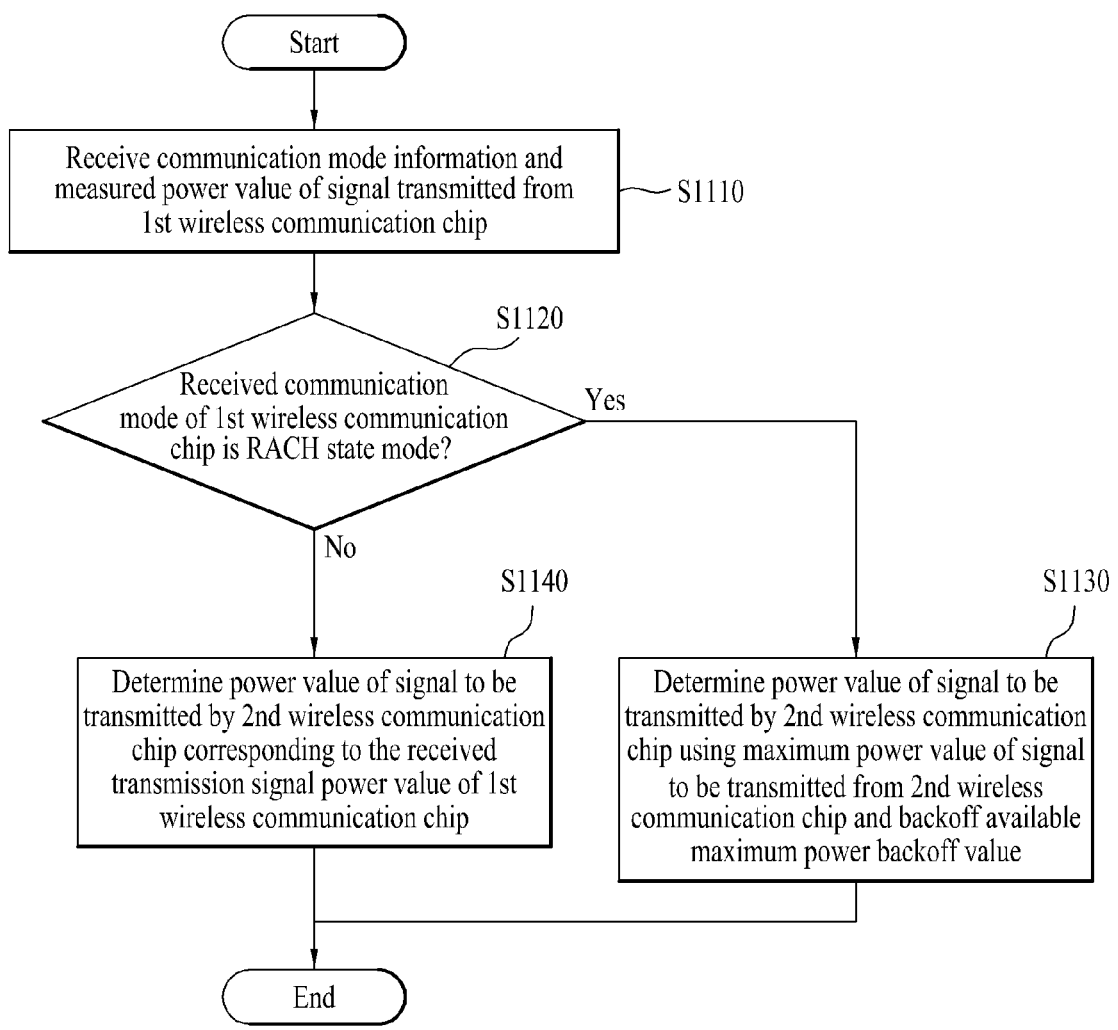
FIG. 11 is a diagram of a process for controlling a power of a user equipment in a second wireless communication chip according to the present invention.

FIG. 11 is a diagram of a process for controlling a power of the user equipment 600 in the second wireless communication chip 620 according to the present invention.

Referring to FIG. 11, the second receiving module 621 receives a communication mode information and a power value of a signal transmitted by the first wireless communication chip 610 from the first transmitting module 613 via the interface 630 [S1110]. If the second transmission power value determining module 622 determines that the communication mode information of the first wireless communication chip 610, which is received by the second receiving module 621, is the RACH state mode [S1120], the second transmission power value determining module 622 can determine a transmission power value of a signal, which is to be transmitted by the second wireless communication chip 620, using a maximum transmission power value of a signal to be transmitted by the second wireless communication chip 620 and a maximum power backoff value of the signal to be transmitted by the second wireless communication chip 620 [S1130]. In particular, the second transmission power value determining module 622 can determine the transmission power value of the signal, which is to be transmitted by the second wireless communication chip 620, as a value resulting from subtracting the maximum power backoff value of the signal to be transmitted by the second wireless communication chip 620 from the maximum transmission power value of the signal to be transmitted by the second wireless communication chip 620. In this case, the maximum power backoff value of the signal to be transmitted by the second wireless communication chip 620 can be previously set [S1130].

On the contrary, if the second transmission power value determining module 622 determines that the communication mode state of the first wireless communication chip 610, which is received by the second receiving module 621, is not the communication mode for performing the RACH process [S1120], the second transmission power value determining module 622 can determine a transmission power value of a second signal, which is to be transmitted by the second wireless communication chip 620, corresponding to the transmission power value of the signal transmitted by the first wireless communication chip 610 or the transmission power value of the signal to be transmitted by the first wireless communication chip 610 [S1140]. In particular, the second transmission power value determining module 622 can determine the transmission power value of the signal, which is to be transmitted by the second wireless communication chip 620, as a value resulting from subtracting a predetermined power backoff value, which is predetermined to be power-backed off in accordance with a transmission power value measured for the signal transmitted by the first wireless communication chip 610, from the maximum transmission power value of the signal to be transmitted by the second wireless communication chip 620 [S1140].

Embodiments of the present invention can be implemented using various means. For instance, embodiments of the present invention can be implemented using hardware, firmware, software and/or any combinations thereof.

In case of the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various well-known means.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A user equipment (UE) of a wireless communication system, the UE comprising:
    a second receiving module, of a second wireless communication chip, configured for receiving communication mode information from a first communication module of a first wireless communication chip indicating whether the first wireless communication chip is in a random access channel (RACH) mode for performing a RACH process for an access to a base station; and
    a power value measuring module configured to measure a transmission power value of a first signal transmitted via the first wireless communication chip only when the first signal and a second signal are to be simultaneously transmitted respectively via the first wireless communication chip and the second wireless communication chip;
    a power value determining module of the second wireless communication chip, configured for determining a transmission power value of the second signal based on whether the first wireless communication chip is in the RACH mode,
    wherein if the first wireless communication chip is in a normal mode, the transmission power value of the second signal is determined by subtracting a power back-off value from a maximum transmission power value of the second signal wherein the power back-off value is determined according to the transmission power value of the first signal,
    wherein if the first wireless communication chip is in the RACH mode, the transmission power value of the first signal is gradually increased when the first signal is transmitted unsuccessfully and the transmission power value of the second signal is determined by subtracting a maximum value of the power back-off value from the maximum transmission power value of the second signal, and
    wherein the first wireless communication chip is configured for transmitting the first signal using a first wireless communication scheme, and the second wireless communication chip is configured for transmitting the second signal using a second wireless communication scheme.

2. The UE of claim 1, wherein the power value determining module is further configured to determine the power back-off value as a maximum power back-off value of the second signal when the first wireless communication chip is in the RACH mode.

3. The UE of claim 1, wherein the power value determining module is further configured to determine the power back-off value by subtracting the transmission power value of the first signal from a preset maximum sum power value when the first wireless communication chip is in the normal mode, and
    wherein the preset maximum sum power value is below a predefined specific absorption rate (SAR) condition.

4. The UE of claim 1, wherein the first wireless communication chip comprises:
    a communication mode determining module configured for determining whether the first wireless communication chip is in the RACH mode; and
    a first transmitting module configured for transmitting communication mode information of the first wireless communication chip to the second receiving module.

5. A method of simultaneously transmitting a plurality of signals via a user equipment (UE) in a wireless communication system using at least two wireless communication schemes, the method comprising:
    measuring, via a power value measuring module, a transmission power value of a first signal transmitted via a first wireless communication chip only when the first signal and a second signal are to be simultaneously transmitted respectively via the first wireless communication chip and a second wireless communication chip,
    receiving, via a second receiving module of the second wireless communication chip of the UE:
        the transmission power value of the first signal; and
        communication mode information from the first wireless communication chip indicating whether the first wireless communication chip is in a random access channel (RACH) mode for performing a RACH process for an access to a base station; and
    determining, via a power value determining module of the second wireless communication chip, a transmission power value of the second signal based on whether the first communication chip is in the RACH mode when the second signal is transmitted by the second wireless communication chip simultaneously with the transmission of the first signal by the first wireless communication chip, wherein if the first wireless communication chip is in a normal mode, the transmission power value of the first signal is gradually increased when the first signal is transmitted unsuccessfully and the transmission power value of the second signal is determined by subtracting a power back-off value from a maximum transmission power value of the second signal wherein the power back-off value is determined according to the transmission power value of the first signal, wherein if the first wireless communication chip is in the RACH mode, the transmission power value of the second signal is determined by subtracting a maximum value of the power back-off value from the maximum transmission power value of the second signal, and wherein the first wireless communication chip is configured for transmitting the first signal using a first wireless communication scheme, and the second wireless communication chip is configured for transmitting the second signal using a second wireless communication scheme.

6. The method of claim 5, wherein the power back-off value is set as a maximum power back-off value of the second signal when the first wireless communication chip is in the RACH mode.

7. The method of claim 5, wherein the power back-off value is determined by subtracting the transmission power value of the first signal from a preset maximum sum power value when the first wireless communication chip is in the normal mode, and wherein the preset maximum sum power value is below a predefined specific absorption rate (SAR) condition.

8. The method of claim 5, further comprising:

determining, via a communication mode determining module of the first wireless communication chip, whether the first wireless communication chip is in the RACH mode; and transmitting, via a first transmitting module of the first wireless communication chip, communication mode information of the first wireless communication chip to the second receiving module.

\* \* \* \* \*